Nov. 16, 1965  W. C. DERSCH ETAL  3,218,441
CATHODE RAY CAPTURED SPOT SENSING UNIT
Filed April 4, 1962  6 Sheets-Sheet 1

*INVENTORS*
WILLIAM C. DERSCH
*BY* REYNOLD B. JOHNSON
John J. McCormack

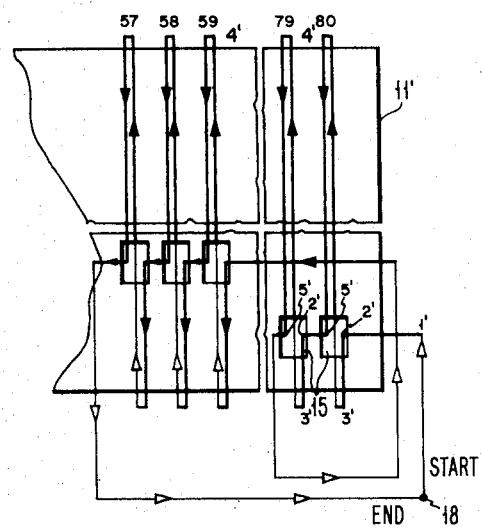
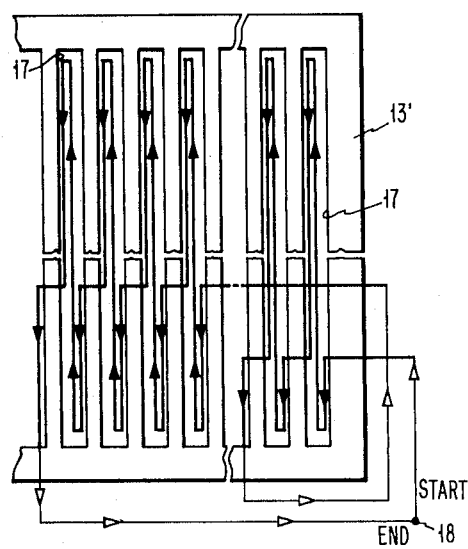
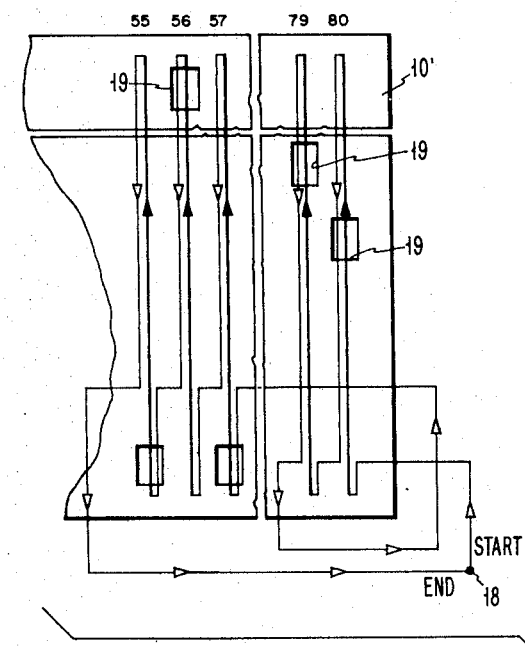
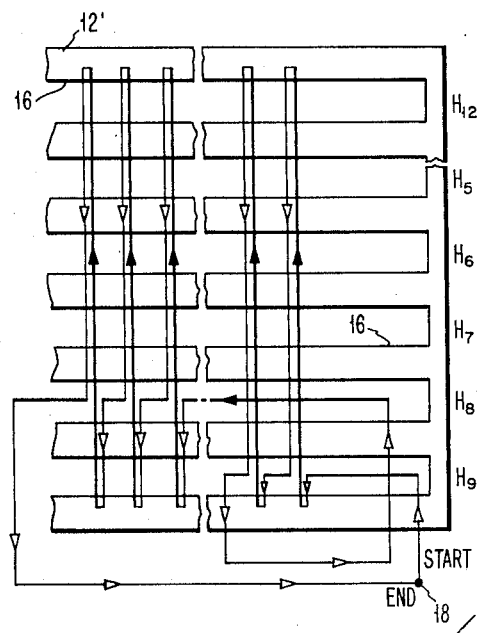
FIG. 3

FIG. 4

| FIXED SEQUENCE STEPS | A PROGRAM CARD CELL 21 | B VERTICAL TRACK FUNCTION REGISTER 54 | C HORIZONTAL TRACK FUNCTION REGISTER 53 | D DETAIL CARD CELL AND FUNCTION REGISTER 31 |
|---|---|---|---|---|
| P1. SEARCH LEFT, HOME POSITION COL. 80, NOW 9 | READ | COUNT TRACK CROSSING, IDENTIFY COL. | MAINTAIN HORIZONTAL REGISTRATION | NON-READ |
| P2. READ HOLE IN PROGAM CARD, MOVE DOWN | READ PROGRAM CONTROL HOLE | MAINTAIN VERTICAL REGISTRATION | NON-READ | NON-READ |
| P3. READ PROGRAM CARD EDGE, MOVE UP | READ "9" CARD EDGE | MAINTAIN VERTICAL REGISTRATION | COUNT TRACK CROSSING, IDENTIFY ROW | READ; 2A & 3C IDENTIFY HOLE LOCATION |
| P4. READ HOLE IN PROGRAM CARD (SECOND READ) | DIS-REGARD | READ DETAIL CARD CYCLE TIME | | |
| P5. READ PROGRAM CARD EDGE, MOVE DOWN | READ "12" CARD EDGE | MAINTAIN VERTICAL REGISTRATION | NON-READ | NON-READ |
| P6. READ HOLE IN PROGRAM CARD (THIRD READ) RETURN STEP #1 | READ PER #2A | COUNT TRACK CROSSING PER 1B | MAINTAIN HORIZONTAL REGISTRATION PER 1C | NON-READ |
| P7. READ LEFT EDGE PROGRAM CARD; RETURN HOME | NON-READ | NON-READ | NON-READ | NON-READ |
| P8. READ LEFT EDGE PROGRAM CARD; RETURN HOME, FEED NEW CARD, RETURN TO STEP #1 | NON-READ | NON-READ | NON-READ | NON-READ |

United States Patent Office 3,218,441
Patented Nov. 16, 1965

3,218,441
CATHODE RAY CAPTURED SPOT
SENSING UNIT
William C. Dersch, Los Gatos, and Reynold B. Johnson, Palo Alto, Calif., assignors to International Business Machines Corporation, New York, N.Y., a corporation of New York
Filed Apr. 4, 1962, Ser. No. 185,155
9 Claims. (Cl. 235—61.11)

The following invention relates to a system for data processing, and more particularly, to a data processing system using radiation-responsive programming and recording means and radiation-responsive scan-alignment means, both of which are simultaneously activated by a scanning radiation source.

In the data processing art, reading apparatus of the serial type suffer the disadvantage of requiring a programming means which is complex and manipulated in a time-consuming and relatively cumbersome manner. A further problem, when the reading means is of the scanning type, is that of scan "drift" and indexing recordation, requiring specially constructed power supplies and controls to keep the beam aligned with the card it is reading.

The instant invention attacks and solves both problems in a simple, convenient manner by controlling programming by the simple expedient of a serially-fed program unit, such as a punched card, while the scanning beam simultaneously reads in both the horizontal and vertical sense. While it moves, the alignment of the beam is constantly monitored to prevent beam drift, as by the use of an optical grating.

It is, therefore, an object of the present invention to provide a data sensing device of the optically channeled, self-correcting type.

Another object is to provide a data processing system of the radiation-sensitive type that is, simultaneously, programmed and read-out by sets of radiation-sensitive cards.

Yet another object is to provide a data reading system of the radiation-sensitive type whose scan is self-correcting for alignment.

A still further object is to provide a data sensing system of the split-beam type that is simultaneously tracked, programmed and read out merely by use of a mobile light beam and a plurality of light detector means, operating in conjunction with plural perforated plates.

Another object is to provide a simple coded-card means for invoking an ordered program of data processing operations.

Another object is to adapt a simple cathode ray tube beam with conventional punched cards and photocell detectors for invoking data processing operations.

Still another object is to read punched cards photoelectrically while simultaneously aligning the read-beam and tracking its excursions with simple grid means.

Yet another object is to provide photoelectric means for reading coded characters printed on cards to be sensed according to the radiation emanating therefrom.

Systems in accordance with the present invention have many different aspects and represent a novel approach to the problems of data presentation and data recognition. The data may be presented simply, in the form of punched cards of the conventional type. These cards are readily available and easily encoded. The cards are read out by a scanning source of radiation, as for example, a conventional cathode ray tube whose scanning beam is of fine resolution. The beam may be employed, after being split, to provide signals simultaneously on a pair of photocells, one for the punched program card and one for the punched detail card. This beam is further split in two other directions and aimed against horizontal and vertical tracking grids, each provided with a photocell detector, so as to detect both the motion and the misalignment of the scanning beam in either the vertical or horizontal direction. The operation of reading the detail card is controlled by the preset program of sequentially ordered interrogation steps, the initiation of which is effected by photoelectric signals indicating the presence of the "programming holes" punched in the program card and detected by the program card photocell. Thus, the program tells the beam how to scan and the program card tells it when to scan and what to read, while the detail card gives a yes or no readout for each interrogation. Thus, there is provided a simple, readily available means for controlling the scan of the reading beam, namely a punched card, and a means for simultaneously aligning the scan along its predetermined horizontal and vertical grid paths, namely a pair of grooved grids with their associated photocells.

A better understanding of the invention may be had by reference to the following description taken in conjunction with the accompanying drawings. The foregoing and other objects, features and advantages of the invention will be apparent from the following more particular description of a preferred embodiment of the invention, as illustrated in the accompanying drawings, wherein:

FIG. 3 is a partial, schematic view of the cards and grids with a typical beam-reading path superimposed thereon;

FIG. 4 is a tabular representation of the reading and sensing operations sequentially arranged with the operations broken down for each photocell system;

Figure 1:
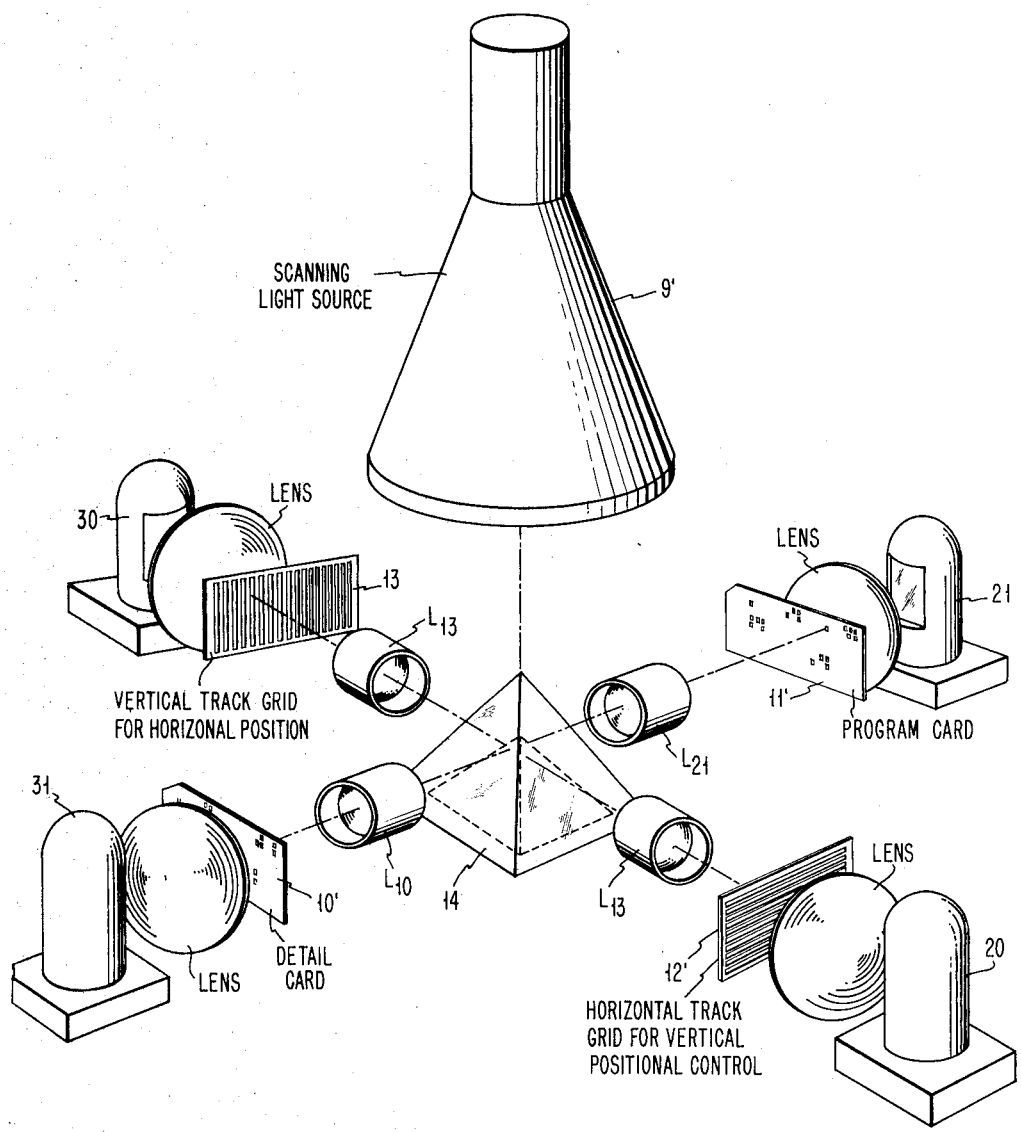
FIG. 1 is a schematic representation of the combination of elements as arranged and interrelated in the described embodiment of the invention.
Figure 2:
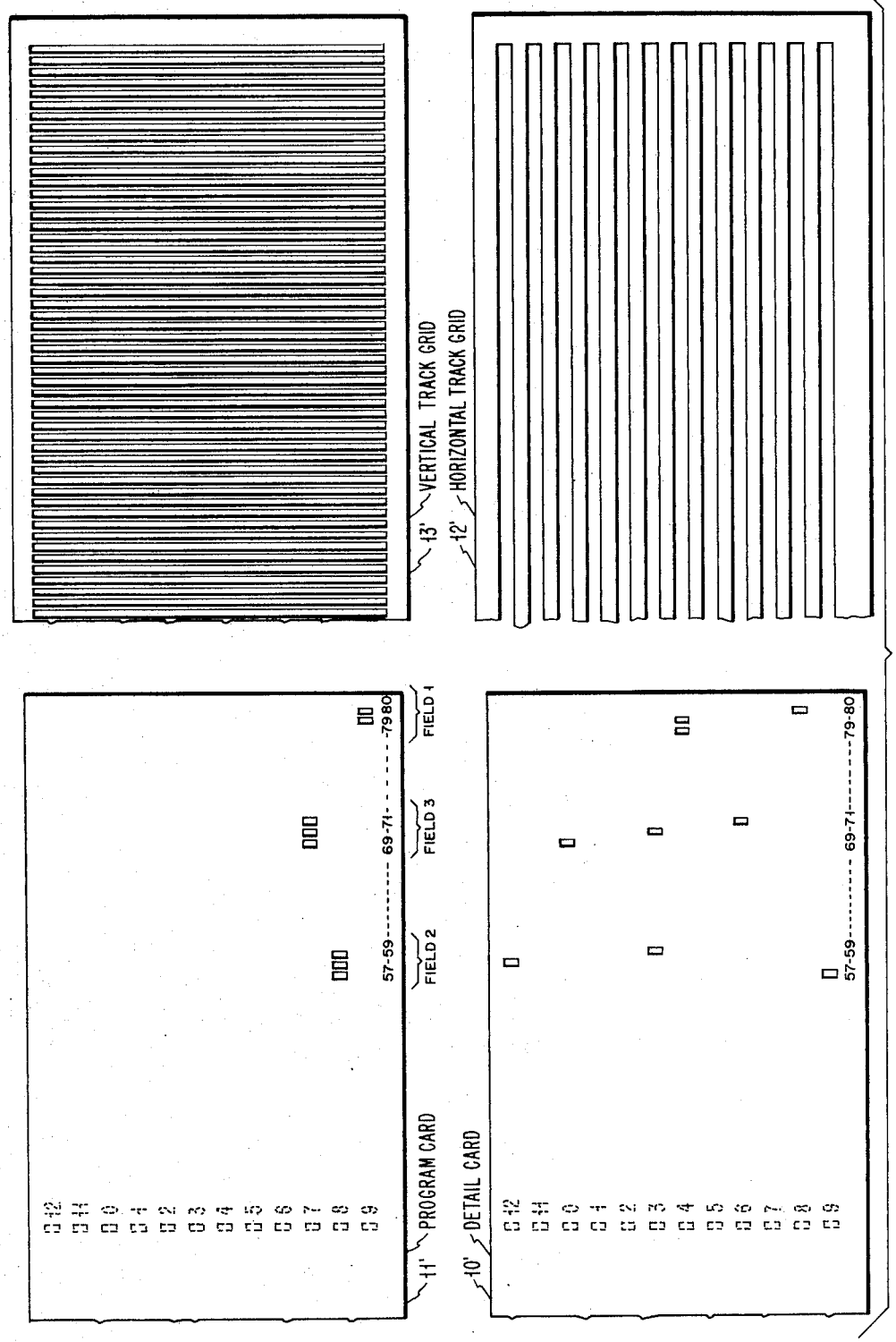
FIG. 2 is a plan view of the cards used and the grids used with a typical punched array provided in the cards.

The operation of the invention is best understood by reference to FIG. 2 wherein the four perforated plates used in the embodiment of the invention are displayed. These plates may take the form of ordinary punched cards. On each of these plates, namely the program card 11′, the detail card 10′ and the horizontal and vertical track grids 12′ and 13′, a typical movement of the cathode ray spot or beam is traced, with typical information reading and track aligning operations illustrated in an exemplary manner in FIG. 3. The program card 11′ tells us that the first field, or row, has readout data in columns 79 and 80. Accordingly, in the first excursion of the spot across the program card (see FIG. 3), the spot will be commanded to read the detail card when it passes column 79 and likewise for column 80. This command will be initiated by the photoelectric sensing of a hole along this row at column 79 and column 80.

Since the plates in this illustrated embodiment take the form of punched cards, the program card and detail card are assumed to have the conventional 12 rows and 80 columns or field groups. The different rows provide the means whereby the interrogation sequence may be varied, since the scanning operation will be programmed to sequentially proceed along the rows successively. As an example, the light beam could start at row 9 and proceed in order up the card to row 12, making a horizontal scan across the card at each row level and returning to "home" to begin the scan of the next level. Hence, it is apparent that the program card provides a means whereby the order of the question as well as the type of question may be controlled and varied. This is particularly useful when one is interrogating cards "in depth," that is, when some of the questions to be asked will depend upon the answers to prior questions. One example of this might be the interrogation of a series of detail cards representing personnel information which is being interrogated for tax purposes and during which the program card interrogates the detail card as to the married status of the employee. If the detail card indicates that a given employee is married, the program card, in conjunction with logical circuitry, will then, and only then, schedule a subsequent interrogation as to the name of the wife of the employee since this will be pertinent only for married men. This is accomplished by locating the "wife" field sequentially after the "marital status" field and making the interrogation of the former depend upon the response to the latter interrogation. In like manner, other interrogation sequences which are dependent upon prior responses may be ordered according to the sequence in which the field is interrogated. It becomes evident then that the program card is used so that the presence of a hole therein will command the beam to interrogate the detail card, and thus the program card may determine what questions are asked and when (in what order) they are asked.

The detail card 10' will have holes representative of responses to questions, each column in the card representing a different question and the presence or absence of a hole in a column, as well as its row location, constitutes the information format. If the cards are used as the means for aligning the beam, they need only be grooved in a suitable manner to provide the "track" along which the beam is aligned with the rows or columns while it is scanning. In this manner, the grooves along the horizontal track card 12' will be drawn so as to provide a channel along which a beam may proceed in alignment with the rows on the program card 11' and the detail card 10'. These horizontal tracks, further, provide a means of counting the rows crossed as the beam scans in the vertical direction and thus identify row location. Similarly, the vertical track card 13' is positioned so as to align a scanning beam along the columns of the program card and the detail card, and may also be used as a counting means for counting the number of columns passed as the beam scans in the horizontal direction.

Figure 5:
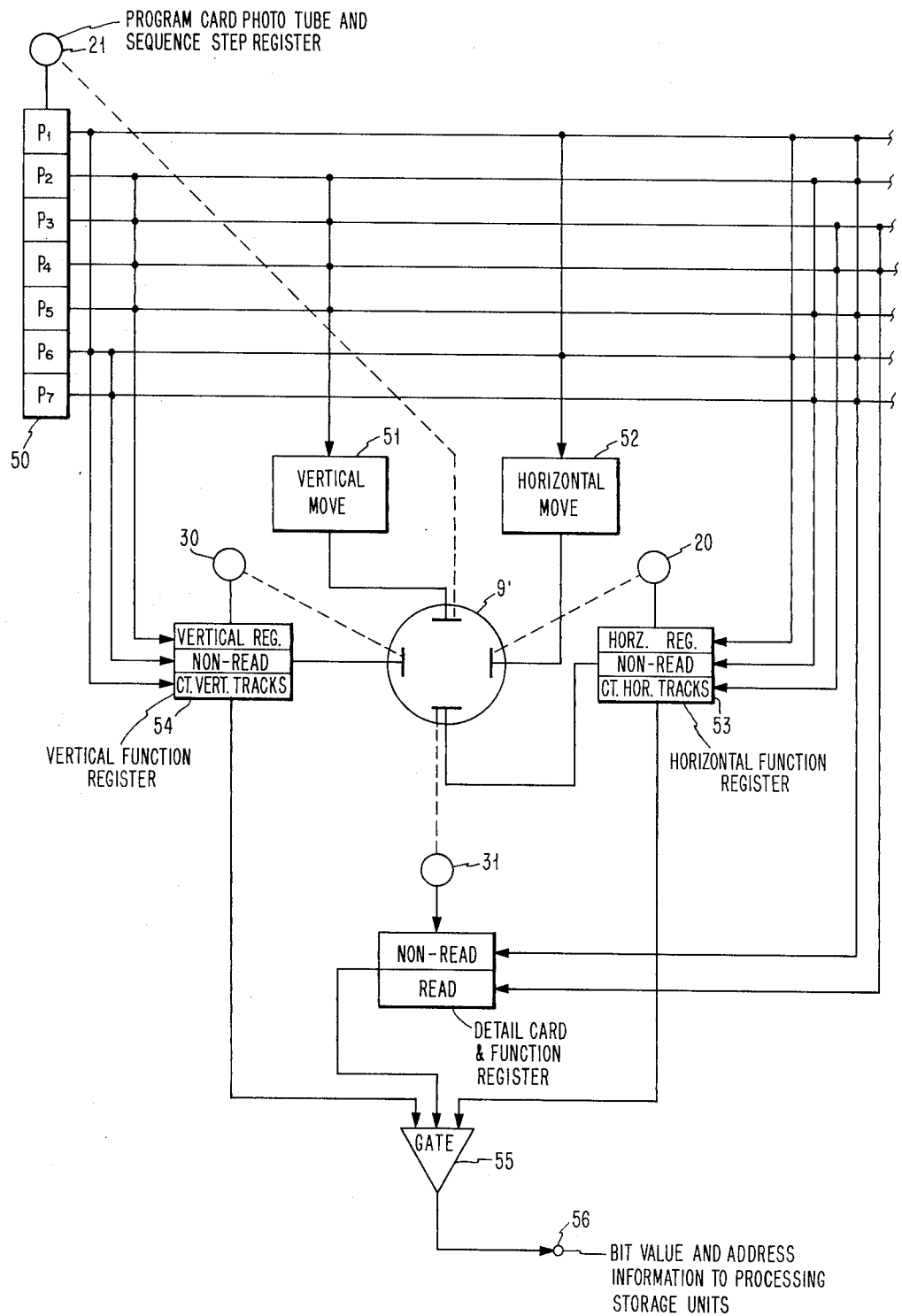
FIG. 5 is a schematic representation of the programming circuitry.

Referring now to FIG. 3, the functions of the cards and tracks referred to above may be graphically illustrated by tracing the scanning beam along a typical series of interrogation sequences. The beam starts its scanning excursion from the origin 18, moving in an upward direction to point 1', at which time it crosses the horizontal track H9 (corresponding to row 9 on the cards) and is instructed to move horizontally across the program card 11' so as to scan the first field (step P1, FIGS. 4 and 5). As it moves across the program card 11' it is held in alignment with row 9 by the H9 track of the horizontal track grid 12', coacting with an associated photoelectric alignment system 2D, described below in the reference to FIG. 6. As the beam begins its horizontal excursion it meets a hole 15, punched on the program card 11' at point 2' lying in vertical column 80, and is signaled to move down (step P2, FIGS. 4 and 5). This "down" command is indicated by the presence of an output pulse at the photocell associated with the program card resulting from the transmission of the light beam through the hole 15 punched in that card 11'. As seen in FIG. 5, more particularly described below, the "initial" pulse from the photocell 21, associated with the program card 11', serves to command the initiation of the sequencing of steps by the programming means 50. Hence, this first pulse will cause the programming means to invoke step two in its fixed sequence of steps, namely, move the beam down to the edge of the program card. In like manner, as successive pulses are received from the photocell 21, and other photocells in their respective orders, the programming means 50 will invoke other successive steps to complete the fixed sequence cycle in the predetermined manner. These fixed steps are described in tabular fashion in FIG. 5.

The down step is a "begin to read" signal which is invoked each time the spot strikes a perforation in the program card and initiates a programmed sequence of operations as delineated in FIG. 4. The "down" step is step 2 in FIG. 4 and provides a uniform reading excursion of the beam from the bottom-most to the top-most part of a given column in the detail card 10', that is, from point 3' to point 4'. The exact definitions of the origin for the upward reading excursion is established by a photocell signal at 3', the edge of the program card 11', which signals and directs the beam to move up (step 3, FIGS. 4 and 5). The upward extremity is established by a photocell-signal at the top-most edge of the card, point 4', which directs the beam to return downwardly and resume its horizontal excursion, having finished the upward "reading" movement (step 5, FIGS. 4 and 5). By way of exemplifying the alignment mechanism, it should be noted that the "read" motion up column 80 is kept in alignment by a tracking photocell 30 along the "80" column or "track" 17 of the track grid 13'. This maintains alignment in the vertical direction in the same manner as the horizontal track grid 12' was said to have done above by virtue of its tracks 16, corresponding to tracks 17 in the vertical grid 13'. As the spot returns to renew its horizontal excursion, the same perforation 15 in column 80 that invoked the "read" excursion will now invoke the "continue searching" excursion along horizontal track H9 (step 6, FIGS. 4 and 5). Thus, when the beam hits the same hole in column 80 in the program card for a third time, at 5', it is directed to continue its "searching" motion left-ward.

Turning from the program card 11' to the detail card 10', it is evident that during the reading excursion upward along column 80 of the detail card 10' a detail hole 19 was passed. This constitutes the "answer" to the "interrogation" invoked by the hole 15 in the program card 11' whereby the spot traversed column 80. To illustrate, the program card 11' might constitute the program for conducting a survey of personnel data on company employees. In doing so, it would interrogate a large number of employee data cards via reading the detail cards, punched to describe characteristics of these employees according to a code. As one parameter to be checked, the program card might interrogate every detail card as to the sex of each employee. Thus, it would "ask," by means of the program-hole 15 in column 80 of card 11' whether the employee was a male. In effecting this, hole 15 would direct the spot, via a photoelectric signal, to scan the vertical length of the detail card, that is, up column 80, and at point 19 the presence of the hole 19 would constitute a "yes" response and would be indicated by photoelectric output from cell 31 (step 3, FIGS. 4 and 5). In addition to the mere presence or absence of a hole, further information is built into this system via the positioning of the hole 19. This is detected by a photoelectric counting of the tracks crossed in the upward direction across the horizontal grid 12'. Thus, a counter 60 (cf. FIG. 6), associated with grid cell 20, would register 4 grid crossings at the time that the detail card 10' indicates a hole 19. This could be coded according to row number to represent the number of years experience with the company that the man had. Thus, information may be read out by the instant invention according to four different parameters, namely, horizontal field number, vertical column number, the presence or absence of a hole in the detail card and the row location of such hole.

Resuming the scan of card 11', we note that the reading cycle is next invoked at point 2 in column 79. The above reading cycle initiated by the hole in a program card in column 80 is again initiated by the output from cell 21 to programmer 50 which is now in "reset" condition. At this point, the reading cycle repeats as described above, this time registering the presence of a hole 19 in column 79 of the detail card 10', but in this instance, in row 5. In the above manner, the program card will continue searching horizontally along row 9, stopping to "read" detail card 10' wherever it senses the presence of a hole in program card 11'. When there is no coincidence between a program pulse and the vertical track, the end of field is signaled, this pulse indicating that the edge of the card 11' has been reached (step 7, FIGS. 4 and 5). The spot then returns to "home" position 18 and pulses a counter to "step up" the spot to the next row in order, in this case row 8, and begins a new horizontal search. The above reading process is repeated at each hole in this field, namely, columns 59, 58 and 57 in our exemplary card 11'.

In the manner described above, the cathode ray spot will search each horizontal field along the horizontal grid track 12', kept aligned thereon via the grid alignment control, and take a reading excursion wherever it finds a hole 15 in a given field of the program card 11'. During this horizontal and vertical scanning, the beam is kept aligned by the vertical grid 13' and horizontal grid 12'. This two dimensional aligning control is one function performed by grids 12' and 13'. Thus, the tracks 16 and 17 in the grids enable the search to be conducted in an aligned manner, keeping the spot in registry with the designated row on the program card 11' and the corresponding row on the detail card 10', despite the expected drift in the cathode ray tube scanning controls.

The other function of the grids is counting. Via its counting function, the horizontal grid 12' provides a means whereby the position of a read-hole 19 in a detail card 10' may be detected and recorded according to the number of horizontal tracks 16 traversed, corresponding to the number of pulses from its associated photocell 20. Vertical grid 13 and cell 30 likewise count vertical-column-crossings and provide location information.

The above typical reading operations of the cards in FIG. 3 may be better understood when related to the arrangement shown in FIG. 5 illustrating the means for applying signals to the program means 50 and for transmitting the commands emanating from the programmer 50 to effect the appropriate movement of the scanning beam and the appropriate registration processes. FIG. 5, in turn, is best understood when read in conjunction with FIG. 4 which incorporates, in tabular form, the functions prearranged by the programming system. Hence, the steps in FIG. 4 are described below, referring to pertinent elements in FIG. 5 as they come into play. It will here be noted that the steps in the programmer (P-1 through P-7) have been noted at the appropriate stages of the scanning operations described above. The steps as listed in FIG. 4 constitute a fixed sequence of programming steps intended to emit a control (or gating) signal at fixed stages in the reading process, these stages to be invoked by the presence of holes indicated by photoelectric pulses from the program cell 21. Columns A, B, C and D represent the condition of the photocells of the cards and tracks as a result of commands given them by the programming means 50. In step P1, the beam, starting from its home position 18 where it is normally at rest, is commanded to move up to the first row (row 9) and begin searching leftward. This command may be invoked by the insertion of a detail card into the read position, beginning the entire reading cycle. As the spot starts its searching motion to the left, programming means 50 commands the vertical track cell 30, a part of the vertical function register 54, to count the vertical columns crossed, thus identifying the column location when a hole in the program card 15 is first encountered. The horizontal-track cell 20, a part of horizontal function register 53, is instructed simultaneously to maintain horizontal alignment of the beam with row 9. The detail card cell 31 is in a "non-read" state at this time.

The reading of a program hole 15, detected by the output from the program cell 21, invokes step P2 in the programming means 50. In this step, the programming means 50 instructs the vertical function register 54 to maintain vertical alignment with column 80 of the beam when it is caused to move down (from point 1' to 2' in FIG. 3) by a simultaneous command to the vertical move means 51. The horizontal cell 20 and detail cell 31 are kept in non-read state at this time.

Step 3 is invoked when the program cell 21 registers its next pulse, corresponding to the detection of the bottom edge of the program card 11'. This corresponds to a move from 2' to 3' in column 80 of FIG. 3. As in step 2, vertical cell 30 in register 54 is commanded to maintain vertical alignment while the horizontal function register 53 is instructed to count the track crossings as the beam the beam moves up as in response to the simultaneous "up" command to the vertical move means 51. This constitutes the "detail-reading" scan during which the beam scans the detail column from top to bottom in column 80 of detail card 10'. A contemporaneous command is issued by programmer 50 to the detail cell 31 instructing it to "read" by gating the output of cell 31 to the output terminal 56. Thus, the read-output from detail cell 31 will indicate the presence of a hole 19 in column 80 while the counting output from the horizontal function register 53 will indicate the row (row 9 here) on which the sensed hole 19 in a detail card 10' is located. The detail card pulse and the horizontal track count pulses are registered at the output station 56 in synchronous fashion so that they may be compared to establish the "row" signal which coincided with the "hole" signal.

Step 4 consists merely in a "disregard" command to cell 21 whereby the next output from program cell 21 will be ignored since it merely indicates that the scanning beam is moving up the column for reading purposes, and therefore must necessarily again pass the hole in the program card. Of course this disregard command may precede or follow the read-pulse from detail cell 31, depending upon whether or not it lies above or below the detail hole 19.

In step 5, the top edge of the program card is sensed by an output pulse from program cell 21, which pulse invokes a "move down" command from programmer 50 to the vertical plate 51 on the CRT. Simultaneously, the vertical function register 54 will be directed to maintain vertical alignment registration, and the horizontal register 53 and detail cell 31 will be kept in "non-read" condition.

Step 6 is invoked by the next output from the program cell 21, indicating the re-sensing of the program hole 15 in program card 11' and thus the return to the start position of this whole reading cycle and, subsequently, the resumption of the left-ward searching scan (cf. 5' in column 80, FIG. 3), in response to a command from programmer 50 to horizontal plate control 52. Simultaneously, the horizontal register 53 is commanded to maintain alignment and the vertical register 54 directed to recount the vertical tracks traversed so as to establish the column number of the next program hole 15 encountered. Detail cell 31 is in non-read state at this time.

Step 7 is invoked by detection of the edge of card 11' or "end of field." Coincidence of outputs from cell 21 and cell 20 is one way of indicating this.

The invocation of step 7 results in the commanding of the beam to return to the "home" position 18 where it is ready to begin scanning anew across the next row in order, here row 8. Thus, step 7 also automatically invokes step 1, or the beginning of another "search-cycle." Until step 1 begins, cells 21 and 31 as well as registers 53, 54 and 31, are kept on "non-read" condition. The row-searching sequence is programmed into programmer 50 so that when step 7 is reached, search may continue in any chosen order of rows. This "row-ordering" control may, itself, contain a control, such as an "AND" gate whereby row sequence may be made to depend upon prior information. Thus, questions (or the interrogation of given rows) may be arranged in dependent form, being asked only when a particular response is given to a prior question. Thus, the scanning of row 6 may ask the detail card: Is the subject married?; while the scanning of row 5 might ask: How many children does the subject have? Hence, row 5 would be scanned only if the response to the prior interrogation of row 6 were: "Yes!"

Step 8 is equivalent to step 7 except that it is invoked only when there is not further row to be scanned (end of row order) and commands, in addition, the removal of the instant detail card 10' and the insertion of a new one as well as the resetting of the row ordering means.

Figure 6:
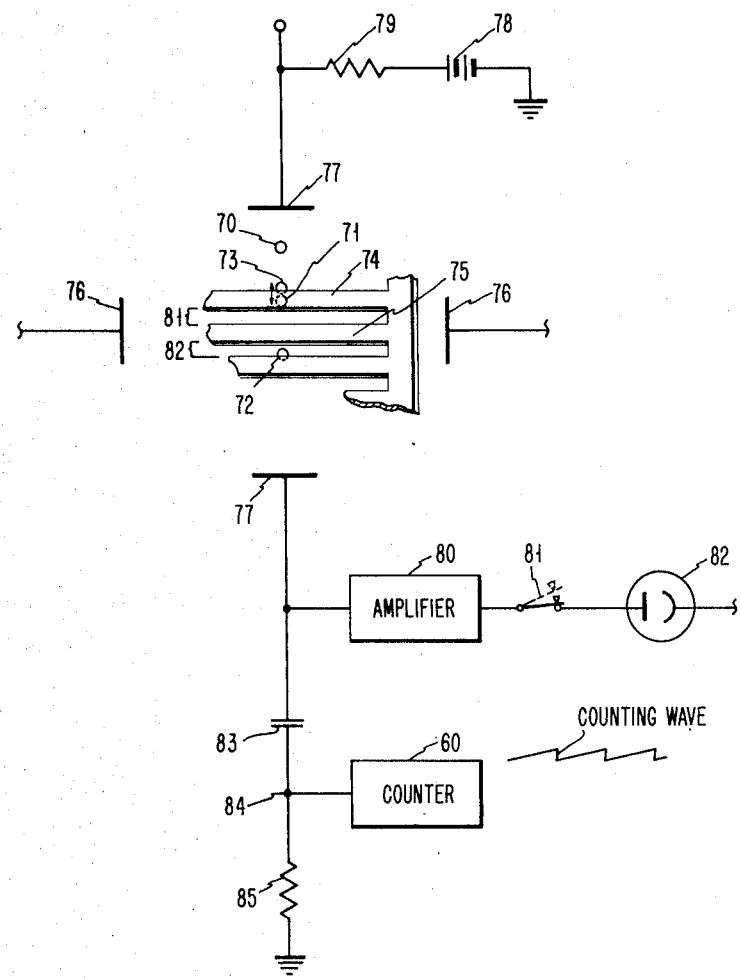
FIG. 6 is a schematic representation of the channel counting means and the beam aligning system associated with the invention.

The alignment of the CRT spots, as well as the counting function for counting the number of horizontal or vertical tracks traversed by the spot, both accomplished photoelectrically, are illustrated in one embodiment in FIG. 6. FIG. 6 shows, in schematic form, the physical positioning of a typical spot with relation to the detecting photocell, as well as the associated electronic components. For spot-alignment purposes, the null or "rest" position for the spot is shown at 73. This is accomplished by simply adjusting the charge on the deflection plates 77 so that when the photocell 82 is taken out of the circuit by opening switch 81, the spot will assume position 70. Now, when the switch 81 is closed, bringing the photocell 82 into the circuit along with its associated amplifier 80, the charge distribution on deflection plates 77 will be modified so as to drive the spot downwardly until it loses sight of photocell 82, as for example, by assuming position 71 behind the grid track 74. However, this is only a momentary wandering of the spot since the disappearance thereof nullifies the output from photocell 82 so as to begin to return the charge distribution on the plate 77 to its former, "open-switch," condition, urging the spot back toward position 70. The spot will seek to oscillate for a few microseconds in this fashion, above and below the track 74, but very quickly reach a "rest" or null position at 73 where it will ride along the edge of track 74. This is the spot-aligning mechanism that keeps the spot aligned along a horizontal row and a vertical column during the searching and the reading excursions, respectively.

The track-counting mechanism is associated with the same components and operates in the following manner. A suitable counting means 60, as for example, a sensitive relay is placed on the ground side of blocking capacitor 83 which, in turn, is connected to the vertical deflection plates and serves to detect a crossing of a track on vertical grid 13'. A similar system would be connected to the horizontal deflection plates 76 so as to count horizontally in conjunction with the horizontal grid 12'. The counter 60 will receive one pulse each time the spot traverses a channel between tracks such as channel 81 and channel 82 crossed while moving the spot from position 73 to position 72. The reason a pulse appears at counter 60 is due to the output from photocell 82 amplified by amplifier 80, which appears at capacitor 83 whenever the spot is made to traverse a channel. This photocell pulse constitutes the attempt of the system to compensate for the overloaded photocell input by applying a downwardly directing charge upon the vertical plates 77, which charge becomes a "surplus" or overload charge during the short time it takes the spot to move from the "in-channel" or irradiating position such as 70 in the channel to a "mask" or "dark" position such as 71, behind a track such as 74. Thus, by counting the output pulses on capacitor 83, one has an electrical analog corresponding to the number of channels or tracks crossed during a given excursion of the spot.

Although the invention, as described above, is particularly embodied in a system concerned with photoelectric transmission-sensing, it need not be limited thereto, but might equally effectively involve photoelectric reflective-sensing. Using reflective-sensing, the device would simply involve using a mobile source of light such as a CRT beam to scan a plate, such as a paper card, or cheque, upon which is printed a series of binary coded marks representing the information, and thereafter sensing the reflected light. This phenomena would involve essentially a photoelectric signal representative of the modification of reflectivity caused by the presence of such a coded mark against the background reflectivity of the card or plate itself. In this manner, cheques and similar alphanumerical documents could be print-coded and quickly read out according to a photoelectric reflectivity measurement. In a similar manner, the characters could themselves operate as a radiational source (e.g., carbon[14] coating) read out by a scanning detector.

It will be recognized that the systems and methods according to the instant invention may be widely varied. Accordingly, the invention should be considered to include all modifications, variations, and alternative forms falling within the scope of the appended claims. Such modifications, for example, could involve using punched or perforated plates of a different form than the punched cards used to illustrate the perferred embodiment described heretofore. Likewise, the spot-aligning tracks could be printed on the program card or plate or upon the detail card or plate at one edge thereof to represent the columns and the rows respectively, with which the spot could be aligned according to the disclosed invention. The track or channel means whereby the rows and the columns are counted could likewise be printed upon a "noninformational" portion of either of the program or detail cards. Also, the scanning beam could consist of an infra-red, gamma ray or other radiating source.

While there have been described above and illustrated in the accompanying drawings, various systems and methods for reading punched cards in accordance with the invention, it will be apparent that the various elements and steps may be modified or completely supplanted by the use or substitution of other known elements and relationships.

We claim:

1. In a data processing device, the combination comprising:
   a mobile radiation beam;
   beam splitting means for subdividing said beam into a plurality of beams going in different directions;
   scan-programming means for establishing the operations whereby data is read-out;
   program control means including a perforated plate, the perforations of which represent steps of said scan-programming means and indicate the data to be read, as well as the order of read-out, and also including radiation sensing means which senses one of said split beams when the beam passes through one of said perforations, thereby providing an output signal which is presented to said programming means, serving to initiate a step thereof; and
   data recording means including a plate perforated according to a coded representation of data and radiation sensing means which senses another of said split beams when the beam passes through one of said perforations, thereby providing an output signal capable of representing the coded data.

2. In a data processing device, the combination comprising:
   means for providing a light beam and for moving said beam in first and second coordinate directions according to move signals;
   beam splitting means for directing said light beam in a plurality of directions;
   first channeling means including a photoelectric detection means placed in the path of one of said plurality of split beams, and including a plurality of parallel, coplanar lines aligned in said first coordinate direction and interposed between said beam splitting means and said photoelectric detection means to block said split beam when it strikes one of said lines, whereby the output of said photoelectric detection means indicates the passage across one of said lines by said beam;

second channeling means including a photoelectric detection means placed in the path of another of said plurality of split beams, and including a plurality of parallel, coplanar lines aligned to correspond to said second coordinate direction and interposed between said beam splitting means and said photoelectric detection means to block said split beam when it strikes one of said lines, whereby the output of said photoelectric detection means indicates the passage across one of said lines by said beam;

program reading means including a photoelectric detection means placed in the path of a third one of said plurality of split beams, and including a plate having perforations therein, the coordinate location of each of which perforations indicates a program step, said plate being interposed between said beam splitting means and said photoelectric detection means to block said beam except when said beam is directed at one of said perforations;

programming means connected to the outputs of said first channeling means, said second channeling means, and said program reading means, and responsive to the output signals therefrom to detect the coordinate locations of said perforations and providing move signals to said light beam moving means in response thereto; and data reading means including a photoelectric detection means placed in the path of a fourth one of said plurality of split beams, and including a plate interposed between said beam splitting means and said photoelectric detection means, said plate having perforations therein, the coordinate location of each of which indicates data information, said coordinate position being indicated by the outputs of said first and said second channeling means.

3. In a photoelectric data processing system, the combination including:
   a scanning light means;
   read-programming means;
   a first punched-card-sensing means;
   a second-punched-card-sensing means to be interrogated in a manner controlled by said programming means, the type and order of said interrogations being controlled by said first punched-card-sensing means;
   beam splitting means for splitting said scanning light into a plurality of beams and directing said beams against said first and said second sensing means; and
   readout means for indicating output of said second means.

4. The combination as recited in claim 3, wherein said read-programming means includes:
   a plurality of switching terminals representative of a plurality of sequentially ordered readout operations and inter-connecting the outputs of said sensing means with said scanning and readout means to effect said operations;
   wherein said first sensing means includes punched-card-sensing means and light-sensing means, the output of which is directed to a predetermined one of said program steps; and
   wherein said second sensing means also includes card-presenting means and light-sensing means, the output of which is program-connected to the readout station of the system.

5. The combination as recited in claim 3, wherein:
   said first and second sensing means comprise punched cards and means for detecting punches in said punched cards; and
   said first sensing means additionally includes counting means for detecting each of mutually perpendicular coordinate grids for detecting the coordinate position of the punches in said first punched card.

6. The combination as recited in claim 5 wherein said first counting means includes:
   light-sensing means and counting means, the output of which represents the number of rows traversed by said beam;
   wherein said second counting means also includes light-sensing means and counting means, the output of which represents the number of columns traversed by said beam; and
   wherein said readout connection means includes connections between a readout station and said first and said second counting means, respectively.

7. The combination as recited in claim 6 wherein said first and said second counting means each include a grooved plate, the grooves of which are representative of and aligned with the rows and columns respectively of said punched cards.

8. The combination as recited in claim 7 including, in addition:
   a beam alignment means including light detecting means, said alignment means detecting the position of said scanning light with respect to the grooved edges of said first and said second counting plates, the output of which beam alignment means is connected to the scanning controls of said beam source means so as to cause said beam to maintain itself in alignment with one of the grooved edges of said first and said second counting plates, respectively, at predetermined times, which edges are aligned in registry, respectively, with the center of the rows or columns of said first and second punched cards.

9. In a photoelectrically read data-processing system, the combination comprising:
   a cathode ray tube, the beam of which is split in at least four directions and having terminals leading to horizontal and to vertical deflection means;
   program sensing means including a conventional punched card, the perforations of which are coded to represent the content and arrangement of the data to be read out and including light-sensing means, which senses the passage of said CRT beam across a perforation and provides an output signal in response thereto;
   data recording means including a conventional punched card, the holes of which are arranged to indicate the information according to their location and including light-detecting means, which senses the passage of said CRT beam across one of said holes and provides an output signal in response thereto;
   a read-out station for transmitting the output of said data recording means as it has been selected by said program sensing means;
   and read-program means including a plurality of stations having connections, respectively, between said program-sensing means and said terminals and between said recording means, said readout station and said program-sensing means so that the reading operation may be thereby fixed.

References Cited by the Examiner

UNITED STATES PATENTS 2,575,034  11/1951  Tyler et al. _____ 235—61.11
2,975,965   3/1961  Demer et al. _____ 235—61.11

OTHER REFERENCES

Kementsky, IBM Technical Disclosure Bulletin, vol. 4, No. 1, June 1961, pages 70, 71, Data Reduction System-Optical Positioning.

MALCOLM A. MORRISON, *Primary Examiner.*